April 29, 1924.

P. E. NORRIS

STORAGE BATTERY SEPARATOR

Filed Oct. 8, 1921

1,492,260

WITNESSES:

INVENTOR:
Paul E. Norris,
BY
ATTORNEY

Patented Apr. 29, 1924.

1,492,260

UNITED STATES PATENT OFFICE.

PAUL E. NORRIS, OF WILKINSBURG, PENNSYLVANIA, ASSIGNOR TO WESTINGHOUSE UNION BATTERY COMPANY, OF SWISSVALE, PENNSYLVANIA, A CORPORATION OF PENNSYLVANIA.

STORAGE-BATTERY SEPARATOR.

Application filed October 8, 1921. Serial No. 506,340.

*To all whom it may concern:*

Be it known that I, PAUL E. NORRIS, a citizen of the United States, residing at Wilkinsburg, in the county of Allegheny and State of Pennsylvania, have invented certain new and useful Improvements in Storage-Battery Separators, of which the following is a specification.

My invention relates to storage battery separators, and particularly to composite separators, that is, separators comprising two or more members or sheets usually of dissimilar materials.

The present application is a continuation in part of my copending application filed on the 17th day of May, 1921, Serial No. 470,277, for storage battery separators, in so far as the subject-matter common to the two is concerned.

I will describe two forms of separators embodying my invention, and will then point out the novel features thereof in claims.

Figure 1:
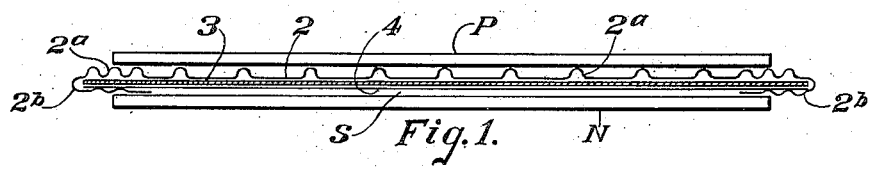
Figure 2:
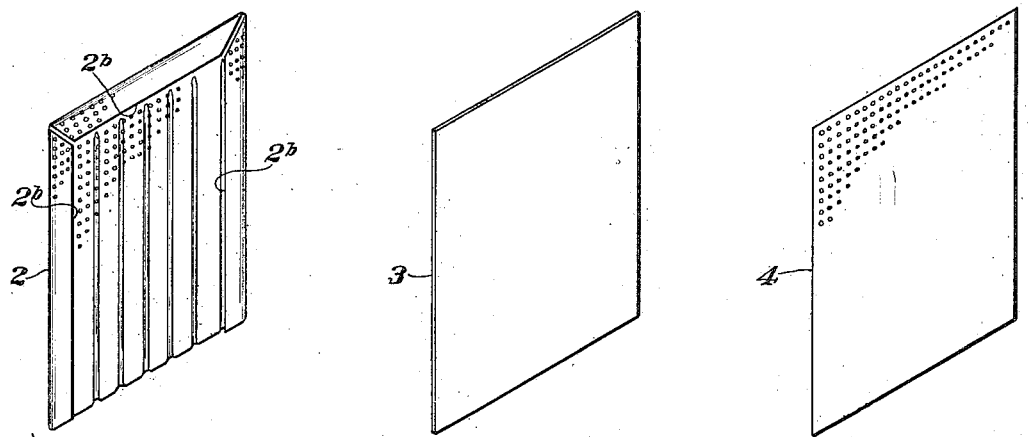
Figure 3:
Figures 4, 5:
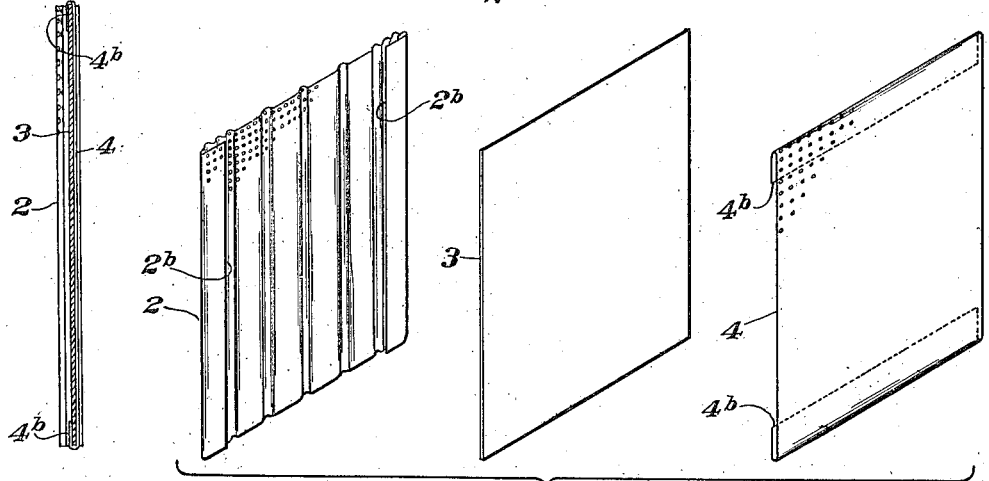

In the accompanying drawing, Fig. 1 is a view showing in horizontal section one form of separator embodying my invention, together with the two battery plates between which the separator is located when in service. Fig. 2 is a view showing in dissembled relation the three sheets which together form the separator shown in Fig. 1. Fig. 3 is a horizontal sectional view, and Fig. 4 a vertical sectional view, of a modified form of separator also embodying my invention. Fig. 5 is a view showing in exploded relation the sheets which form the separator illustrated in Figs. 3 and 4.

Similar reference characters refer to similar parts in each of the several views.

Referring first to Fig. 1, the reference character P designates a positive plate, N a negative plate, and S a separator located between these two plates.

The separator S comprises three sheets 2, 3 and 4, which sheets are illustrated separately and in perspective in Fig. 2. The middle sheet 3, which is flat, is made of some material having the advantageous features which are known to be characteristic of wood when used in an acid storage battery, and it preferably contains wood; as examples, it may be a sheet of wood pulp, or a sheet of wood, such as maple, cypress or cedar. This sheet is preferably, though not necessarily, very thin, such as from five-thousandths to fifteen-thousandths of an inch in thickness.

The outside sheet 2 is of an insulating material impervious to electrolyte acid, such as celluloid or hard rubber, and is preferably perforated as shown, although the perforations are not essential to my invention. This sheet is also preferably provided with ribs $2^a$ projecting towards the positive plate P, although these ribs or other spacing expedients are not essential to my invention. This sheet is turned back on itself along one or more of its edges to form channels or guides $2^b$ which are adapted to receive and enfold the corresponding edge or edges of the middle sheet 3. As here shown, the two side edges and the top edge are provided with these channels, but other arrangements and locations of the channels may be employed as desired.

The third sheet 4 is made of material similar to that of sheet 2, but is not provided with ribs or channeled edges. This third sheet is not essential in all instances, and may be omitted without departing from the spirit or scope of my invention.

To assemble the separator shown in Fig. 1, the middle sheet 3 is slipped into place in the channels $2^b$ of sheet 2, and the third sheet 4, if used, is then slipped into place in the same channels but against the outer surface of sheet 3.

The channels $2^b$ serve several useful purposes. They prevent lateral relative displacement of all three sheets, and also vertically upward displacement of sheets 3 and 4 with relation to sheet 2. It will be observed that the middle sheet 3 is of a material having relatively little mechanical strength, while sheet 2 is of a material having relatively great mechanical strength, and that sheet 2 is folded over certain edges of sheet 3. These folds or channels serve to protect the side and upper edges of sheet 3 from damage while the separator is being slipped into place between the positive and negative plates, and the fold on the upper edge actually facilitates this assembling operation, it being understood that when a battery element is being assembled the separators are slipped into place from the bottom. Furthermore, the fold at the upper edge serves to protect the top of sheet 3 from damage by the insertion of a hydrometer into the completed battery.

Referring now to Figs. 3, 4 and 5, the middle or wood sheet 3 is the same as in Fig. 2. The outer sheet 4 is provided with channels $4^b$ along the top and bottom edges, however, while the outer sheet 2 is provided with channels $2^b$ along the two vertical edges. To assemble this structure, the middle sheet 3 is first slipped into place in the horizontal channels on sheet 4, and these two sheets as a unit are then slipped into place in the vertical channels formed on sheet 2. The finished separator has substantially the same advantageous features as the separator shown in Figs. 1 and 2. Either of the outside sheets 2 or 4 may be omitted from the structure shown in Figs. 3, 4 and 5 without departing from my invention.

One important feature of both of the illustrated forms of my invention is that any one of the sheets may be removed and replaced by a new sheet without damaging the remaining sheets in any way.

Although I have herein shown and described only two forms of separators embodying my invention, it is understood that various changes and modifications may be made therein within the scope of the appended claims without departing from the spirit and scope of my invention.

Having thus described my invention, what I claim is:

1. A storage battery separator comprising a sheet formed of a material impervious to electrolyte acid, said sheet being turned back on itself along two opposite edges to form channels, and a second sheet made of a material having the characteristics of wood and held in place by said channels.

2. A storage battery separator comprising sheets of different materials, one sheet being turned back on itself to form channels to receive another sheet.

3. A storage battery separator comprising a sheet containing wood, a second sheet of material impervious to electrolyte acid turned back on itself along two opposite edges to form channels adapted to receive said first sheet, and a third sheet of material similar to that of the second sheet and turned back on itself along the other two opposite edges to form channels adapted to receive the first two sheets.

4. A storage battery separator comprising two sheets of similar material and a third sheet of different material, and channels formed on each of the first two sheets for holding the three sheets together in proper relative positions.

5. A storage battery separator comprising two sheets of different materials, one of said sheets being provided with channels along two opposite edges to receive the other sheet.

6. A storage battery separator comprising a sheet containing wood pulp and a sheet of material having greater mechanical strength, the second sheet being folded over the first along the upper edge to protect the first sheet.

7. A storage battery separator comprising three sheets, the second being folded over the first along two opposite edges, and the third sheet being folded over the first two along the remaining two opposite edges.

8. A storage battery separator comprising two sheets of dissimilar materials, one sheet being folded over the other along at least one edge.

9. A storage battery separator comprising two sheets, one of which is folded over the other along at least one edge.

10. A storage battery separator comprising two sheets, one sheet being folded over the two vertical edges and the upper edge of the other.

11. A storage battery separator comprising a sheet containing wood, a second sheet of insulating material impervious to electrolyte acid turned back on itself along the two vertical edges and the upper edge to form channels or guides adapted to receive and enfold the corresponding edges of the first sheet, and a third sheet of material similar to that of the second sheet lying against the outer surface of the first sheet and held in place by the channels on the second sheet.

In testimony whereof I affix my signature.

PAUL E. NORRIS.